(12) United States Patent
Sakamoto et al.

(10) Patent No.: US 10,794,878 B2
(45) Date of Patent: Oct. 6, 2020

(54) GAS CHROMATOGRAPH MASS SPECTROMETER

(71) Applicant: SHIMADZU CORPORATION, Kyoto-shi, Kyoto (JP)

(72) Inventors: Yuki Sakamoto, Kyoto (JP); Takashi Sumiyoshi, Kyoto (JP); Yoshiro Hiramatsu, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 175 days.

(21) Appl. No.: 16/082,589

(22) PCT Filed: Mar. 7, 2016

(86) PCT No.: PCT/JP2016/056928
§ 371 (c)(1),
(2) Date: Sep. 6, 2018

(87) PCT Pub. No.: WO2017/154062
PCT Pub. Date: Sep. 14, 2017

(65) Prior Publication Data
US 2019/0086372 A1    Mar. 21, 2019

(51) Int. Cl.
*G01N 30/72* (2006.01)
*G01N 27/62* (2006.01)
(Continued)

(52) U.S. Cl.
CPC ......... *G01N 30/7206* (2013.01); *G01N 27/62* (2013.01); *G01N 30/72* (2013.01);
(Continued)

(58) Field of Classification Search
CPC .... G01N 30/7206; G01N 30/72; G01N 27/62; G01N 2030/8458; G01N 2030/025
See application file for complete search history.

(56) References Cited

U.S. PATENT DOCUMENTS

| | | | |
|---|---|---|---|
| 8,378,293 B1 * | 2/2013 | Quimby | G01N 30/7206 250/282 |
| 2009/0039250 A1 | 2/2009 | Ishimaru et al. | |
| 2011/0240848 A1 | 10/2011 | Wells | |

FOREIGN PATENT DOCUMENTS

| | | |
|---|---|---|
| JP | 05-089822 A | 4/1993 |
| JP | 11-307041 A | 11/1999 |

OTHER PUBLICATIONS

Arrebola et al., "Determination of 81 multiclass pesticides in fresh foodstuffs by a single injection analysis using gas chromatography-chemical ionization and electron ionization tandem mass spectrometry", Analytica Chimica Acta, 2003, vol. 484, pp. 167-180 (total 14 pages).

(Continued)

*Primary Examiner* — Herbert K Roberts
*Assistant Examiner* — John M Royston
(74) *Attorney, Agent, or Firm* — Sughrue Mion, PLLC (57) ABSTRACT

A GC/MS measurement under an ionization by an electron ionization method is performed for a target sample (S1). Peaks are detected on a chromatogram based on obtained data, and a mass spectrum corresponding to each peak is compared with a compound database to identify a compound (S2-S4). A compound identified with a low degree of similarity is extracted as the measurement compound. For this compound, a measurement window including the retention time of a peak corresponding to the compound is set, and a control program for performing an ionization by a chemical ionization method only within the measurement window is created (S5-S8). According to this control program, a GC/MS measurement for the target sample is performed, with the device controlled so that a reagent gas is supplied into an ionization chamber and a filament for generating thermions is energized within the measurement window, whereas the supply of the reagent gas is discontinued and the (Continued)

filament is deenergized within time ranges other than the measurement window (S9). Since no reagent-gas ion is generated within the time ranges other than the measurement window, the adhesion of the ions to the inside of the ionization chamber and other locations will be reduced. Accordingly, a stable measurement can be performed for a long period of time.

9 Claims, 4 Drawing Sheets

(51) Int. Cl.
  *G01N 30/02* (2006.01)
  *G01N 30/84* (2006.01)
(52) U.S. Cl.
  CPC ............... *G01N 2030/025* (2013.01); *G01N 2030/8458* (2013.01)

(56) References Cited

OTHER PUBLICATIONS

Communication dated Dec. 18, 2019 from the State Intellectual Property Office of the P.R.C. in counterpart Application No. 201680083342.1.
Communication dated Feb. 14, 2019 from the European Patent Office in application No. 16893394.3.
Kalachova, K., et al., "High throughput sample preparation in combination with gas chromatography coupled to triple quadrupole tandem mass spectrometry (GC-MS/MS): A smart procedure for (ultra)trace analysis of brominated flame retardants in fish", Talanta, vol. 105, 2013, pp. 109-116 (8 pages).
International Search Report for PCT/JP2016/056928 dated May 17, 2016.
Communication dated Aug. 13, 2020 from the Indian Intellectual Property Office in counterpart Application No. 201847034810.

\* cited by examiner

| TIME [min] | CONTENT OF PROCESSING |
|---|---|
| 9.7 | REAGENT GAS ON / FILAMENT ON |
| 10.5 | REAGENT GAS OFF / FILAMENT OFF |
| 11.0 | REAGENT GAS ON / FILAMENT ON |
| 11.6 | REAGENT GAS OFF / FILAMENT OFF |

GAS CHROMATOGRAPH MASS SPECTROMETER

CROSS REFERENCE TO RELATED APPLICATIONS

This application is a National Stage of International Application No. PCT/JP2016/056928 filed Mar. 7, 2016.

TECHNICAL FIELD

The present invention relates to a gas chromatograph mass spectrometer, and more specifically, to a gas chromatograph mass spectrometer in which an ion source capable of selectively performing an ionization by an electron ionization method and one by a chemical ionization method is used as an ion source in the mass spectrometer.

BACKGROUND ART

In a normal type of gas chromatograph mass spectrometer (which is hereinafter abbreviated as the "GC-MS") which uses a mass spectrometer as a detector for a gas chromatograph, various compounds are temporally separated from each other in a column of the gas chromatograph, and those compounds are subsequently ionized in the ion source in the mass spectrometer. The thereby generated ions are eventually detected after being separated from each other according to their mass-to-charge ratios. The ion source needs to be capable of ionizing compounds contained in a gasified sample. To this end, an ion source which employs an electron ionization method (which is hereinafter called the "EI" method) or chemical ionization method (which is hereinafter called the "CI" method) is commonly used.

In the EI method, thermions generated from a filament are accelerated and made to come in contact with component molecules in the sample gas. This causes electrons to be expelled from the component molecules, whereby the molecules are ionized. Ions generated by the EI method normally have an excessive amount of internal energy, and therefore, easily undergo fragmentation and turn into fragment ions. This results in a mass spectrum with various fragment ions observed, allowing the component to be identified by searching a database (spectrum library) for the spectrum pattern of the mass spectrum. The structure of the original molecule can also be investigated from the state of the fragmentation.

In the CI method, a reagent gas, such as methane or isobutane, is introduced into the ionization chamber. Thermions are made to come in contact with the reagent gas to generate reagent-gas ions. Component molecules are introduced into the ambience of those reagent-gas ions to induce a chemical reaction and ionize the component molecules. The ionization by the CI method occurs in a comparatively moderate way. Consequently, a mass spectrum in which a molecule-related ion with no fragmentation (e.g. an ion formed by the addition of a single proton to the molecule) is mainly observed will be obtained. Such an ionization method is particularly useful for acquiring information on the molecular weight of a target compound. In some cases, the kind of compound may also be estimated from the determined molecular weight. The term "CI method" as normally used refers to the case of generating positive ions based on the previously described principle. There is also the technique of generating negative ions by a similar principle, which is called the "negative chemical ionization (NCI) method". Negative chemical ionization, in a broad sense, is also one type of CI method. In the following description, the CI method should be construed as inclusive of the negative chemical ionization.

As just described, the EI and CI methods differ from each other in ionization principle. Accordingly, the two methods often yield different mass spectra for the same compound. For this reason, there has been strong demand for a selective use of the EI and CI methods according to the purpose of the analysis. To meet such demand, an EI/CI combination ion source has conventionally been used, which can be switched between the EI and CI methods by a simple control, such as turning on/off the supply of the reagent gas or changing voltages applied to the electrodes related to the ionization (for example, see Patent Literature 1 or 2).

In the case where the EI method is used in a GC-MS, the identification of a compound based on the spectrum pattern of an obtained mass spectrum is often performed, as noted earlier. Such a measurement is particularly useful for a simultaneous multicomponent analysis for the residual agricultural chemicals in agricultural products, a multicomponent analysis for environmental endocrine disruptors in environmental water, or other similar analyses. However, all compounds cannot always be identified with a high degree of certainty; depending on the kind of compound, condition of the sample or other factors, the similarity of the spectrum pattern for the identified compound may not be sufficiently high, or the identification result may be questionable. Accordingly, a method is often adopted in which both a GC/MS measurement which employs the EI method and one which employs the CI method are performed for the same sample, and the results of the two measurements are combined to eventually identify various compounds contained in the sample. A GC-MS provided with an EI/CI combination ion source mentioned earlier is useful for such a case.

CITATION LIST

Patent Literature

Patent Literature 1: JP 5-89822 A
Patent Literature 2: JP 11-307041 A

SUMMARY OF INVENTION

Technical Problem

However, conventional GC-MSs have the following problem:

As described earlier, in the CI method, a reagent gas is introduced into an ionization chamber which is hermetically closed to a comparatively high degree, and the reagent gas is ionized by thermions. Since a higher concentration of the reagent-gas ions normally means a higher ionization efficiency, a large amount of reagent gas is typically introduced into the ionization chamber. Therefore, an excessive amount of reagent-gas ions which do not contribute to the ionization of the component molecules are present within the ionization chamber. Most of those reagent-gas ions are discharged through the ion ejection port or other openings formed in the ionization chamber into a chamber in which a vacuum atmosphere is maintained. However, some of the ions adhere to the inner wall of the ionization chamber as well as the repeller electrode or other elements inside the ionization chamber. If such a situation further develops, some unintended change occurs, such as a change in the state of the electric field created within the ionization chamber. This may have the effect of deteriorating the ionization efficiency or preventing the ions generated within the ionization chamber from being properly ejected through the ion ejection port, which may cause the detection sensitivity to be lower or the measurement reproducibility to deteriorate.

In particular, in the case of the GC-MS, since various compounds temporally separated from each other by the column of the GC need to be sequentially detected in the mass spectrometer with the passage of time, the ion source operated for a longer period of time than in the case of a single-type mass spectrometer. This means that a larger amount of reagent-gas ions adhere to the inside of the ionization chamber or other locations, so that the previously described problem easily occurs.

The present invention has been developed to solve the previously described problem, and its objective is to provide a gas chromatograph mass spectrometer in which the adhesion of an excessive amount of reagent-gas ions to the inside of the ionization chamber or other locations during the ionization process by the CI method is reduced so as to maintain the measurement in a stable condition, i.e. with high sensitivity and high accuracy, for a long period of time.

Solution to Problem

The present invention developed for solving the previously described problem is a gas chromatograph mass spectrometer employing a mass spectrometer as a detector for a gas chromatograph, the mass spectrometer provided with an ion source including: an ionization chamber to which a sample gas is supplied; a thermion generator for generating thermions; and a reagent-gas supplier for supplying a reagent gas into the ionization chamber, the ion source capable of switching between an ionization by an electron ionization method in which a component in a sample gas supplied into the ionization chamber is ionized by making a thermion generated by the thermion generator come in contact with the component, and an ionization by a chemical ionization method in which a component in a sample gas is ionized by an action of a reagent-gas ion generated by making a thermion generated by the thermion generator come in contact with a reagent gas supplied into the ionization chamber by the reagent-gas supplier, the gas chromatograph mass spectrometer further including:

a) a control information creator for determining a time range during which a gas chromatograph mass spectrometric analysis under the ionization by the chemical ionization method is to be performed, based on a chromatogram obtained by performing a gas chromatograph mass spectrometric analysis on a target sample over a predetermined period of time while performing the ionization by the electron ionization method in the ion source, and for creating control information including a piece of information indicating the time range; and b) an analysis controller for performing a gas chromatograph mass spectrometric analysis on the target sample while performing the ionization by the chemical ionization method in the ion source, by controlling the reagent-gas supplier and the thermion generator based on the control information so as to supply the reagent gas into the ionization chamber by the reagent-gas supplier while generating thermions by the thermion generator during the aforementioned time range, and so as to discontinue the supply of the reagent gas by the reagent-gas supplier and/or discontinue the generation of thermions by the thermion generator within a period of time other than the aforementioned time range.

The ion source of the mass spectrometer in the gas chromatograph mass spectrometer according to the present invention is an EI/CI combination ion source described earlier. The configuration of the mass separator in the mass spectrometer is not specifically limited; it may be a single-type mass spectrometer or a tandem mass spectrometer, such as a triple quadrupole mass spectrometer.

In a typical operation of the gas chromatograph mass spectrometer according to the present invention, the analysis controller initially performs a gas chromatograph mass spectrometric analysis on a target sample over a predetermined period of time while controlling the thermion generator and other relevant sections to perform an ionization by the EI method in the ion source. A chromatogram covering the predetermined period of time is thereby obtained. In the case where a scan measurement is performed in the mass spectrometer, a plurality of mass spectra each of which covers a predetermined range of mass-to-charge ratios are successively obtained with the passage of time.

If a plurality of compounds are contained in the target sample, a plurality of peaks which respectively correspond to those compounds normally appear on the chromatogram. Accordingly, the control information creator determines a time range during which a GC/MS measurement under the ionization by the CI method is to be performed, in such a manner that the peaks located on the obtained chromatogram will be partially or entirely included within that time range. There may be a single time range or multiple time ranges determined in this manner. The control information creator prepares control information including a piece of information indicating the single or multiple time ranges. After the control information has been prepared, the analysis controller receives, for example, a command from a user and conducts a GC/MS measurement for the target sample under the ionization by the CI method, controlling the thermion generator and the reagent-gas supplier according to the control information.

Specifically, the analysis controller operates the reagent-gas supplier to supply the reagent gas into the ionization chamber during the time range determined by the control information creator, as well as operates the thermion generator to generate thermions. By these operations, reagent-gas ions are generated within the ionization chamber during that time range, whereby the components in the sample gas introduced into the ionization chamber are ionized and subjected to mass spectrometry. On the other hand, during any period of time other than the aforementioned time range, the analysis controller discontinues either the supply of the reagent gas into the ionization chamber or the generation of the thermions, or both. This means that no reagent-gas ion is generated within any period of time other than the aforementioned time range, so that no adhesion of the reagent-gas ion to the inside of the ionization chamber or other locations occurs. In other words, the ionization by the CI method is performed only during a period of time where a component to be subjected to mass spectrometry is present in the sample gas. Therefore, as compared to a conventional GC-MS which constantly performs the ionization by the CI method regardless of the kind of component in the sample gas or the presence or absence of a component, the present device can significantly shorten the total length of time during which the ionization by the CI method is actually performed, and can thereby reduce the adhesion of the reagent-gas ions to the inside of the ionization chamber or other locations.

There are several possible modes of the method for determining the time range in the control information creator in the gas chromatograph mass spectrometer according to the present invention.

For example, if the purpose of the analysis is to identify a compound in a sample or confirm the presence or absence of a specific compound, it is unnecessary to perform the GC/MS measurement under the ionization by the CI method for a compound which has been identified with a high degree of certainty or whose presence or absence has been confirmed based on a chromatogram or mass spectrum obtained by performing an ionization by the EI method. In other words, the GC/MS measurement under the ionization by the CI method only needs to be performed for a compound for which an uncertain or questionable identification result has been obtained (or a peak for which that compound has been identified).

Accordingly, in one mode of the present invention, the gas chromatograph mass spectrometer further includes a compound identifier for identifying a compound corresponding to a peak detected on the chromatogram, based on position information of the peak or mass spectrum information obtained by a mass spectrometric analysis at the position of the peak, and the control information creator is configured to extract a compound for which a gas chromatograph mass spectrometric analysis under the ionization by the chemical ionization method needs to be performed, based on an identification result obtained by the compound identifier, and determine the time range from the position of a peak corresponding to the extracted compound.

As for the extraction of a compound for which the GC/MS measurement under the ionization by the CI method needs to be performed, there are two possible cases; the device may automatically perform the extraction process, or a user may determine which compound should be extracted.

Thus, as one mode of the present invention, the control information creator may be configured to extract a compound for which the gas chromatograph mass spectrometric measurement under the ionization by the chemical ionization method needs to be performed, by judging an index value indicating the degree of certainty of the identification, where the index value is calculated when the identification is performed by the compound identifier. An example of the "index value indicating the degree of certainty of the identification" is the degree of similarity in spectrum pattern between a measured mass spectrum and a reference mass spectrum stored in a database.

According to this configuration, the device can automatically set, as the time range, a period of time around the retention time of a peak which corresponds to a compound for which a highly uncertain identification result has been obtained.

As another mode of the present invention, the gas chromatograph mass spectrometer may further include a result presenter for presenting an identification result obtained by the compound identifier to a user, and the control information creator may be configured to extract a compound for which the gas chromatograph mass spectrometric measurement under the ionization by the chemical ionization method needs to be performed, based on an instruction given by the user in response to a presentation of a result by the result presenter.

This configuration allows for the choice of a compound based on a judgment by the user. For example, a compound for which a highly uncertain identification result has been obtained may be excluded from the extraction if the compound is not very important, or conversely, a compound for which a highly certain identification result has been obtained may be intentionally extracted if the compound is very important.

The time range during which the GC/MS measurement under the ionization by the CI method is to be performed may be determined regardless of the identification of the compound, e.g. by allowing the user to specify a peak on a chromatogram. Allowing a user to extract a desired compound in this manner is useful, for example, in the case where the GC/MS measurement under the ionization by the CI method should preferably be performed for a compound which is abundantly present in the sample, regardless of the kind of compound.

Specifically, the control information creator may be configured to determine the time range by setting a predetermined time width as allowance time before and after the retention time of a peak corresponding to the extracted compound, or before and after the beginning point and ending point of the peak. The predetermined time width may be set as default, or users may be allowed to appropriately set the time width.

In that case, the control information creator may preferably be configured to determine the time range for a plurality of temporally neighboring peaks corresponding to a plurality of extracted compounds, in such a manner as to include the interval between the peaks within the time range if the difference in retention time between the peaks is smaller than the predetermined time width.

According to this configuration, if the number of compounds in the sample is so large that there are multiple compounds whose retention times are close to each other, a wide time range is set which includes the retention times of those compounds. Typically, the thermion generator includes a filament and a power supply for supplying an electric current to the filament. The generation of thermions can be suspended by discontinuing the supply of the electric current to the filament. However, the filament will be easily worn if it is frequently and repeatedly tuned on and off. The aforementioned configuration decreases the number of repetitions of the turning on and off of the filament within a short period of time. Therefore, the filament will not be rapidly worn out and its life will be made longer.

In a GC-MS, a continuous analysis for a plurality of samples prepared beforehand is often performed, with the samples automatically and successively subjected to the analysis. In such a continuous analysis, analysis conditions should be set for each analysis. Therefore, for example, it is possible that a GC/MS measurement by the CI method for one sample is followed by a GC/MS measurement by the EI method for the same or a different sample.

Accordingly, as another mode of the gas chromatograph mass spectrometer according to the present invention, the analysis controller may be configured as follows: before or during an execution of an analysis of one sample under the ionization by the chemical ionization method, the analysis controller recognizes the ionization method to be used in another analysis to be performed subsequently to the analysis of the one sample, if such a subsequent analysis is present, and controls the reagent-gas supplier to discontinue the supply of the reagent gas into the ionization chamber and/or controls the thermion generator to discontinue the generation of thermions no later than the completion of the analysis of the one sample under the ionization by the chemical ionization method in the mass spectrometer, if the ionization method to be used in the subsequent analysis is the electron ionization method, or if there is no subsequent analysis to be performed after the analysis of the one sample.

According to this configuration, for example, before or during the execution of an analysis of one sample under the ionization by the CI method in a continuous analysis, the analysis controller recognizes the ionization method which is set as one of the analysis conditions to be used in the subsequent analysis. If the subsequent analysis is an analysis under the ionization by the EI method, which is an ionization method that does not require the reagent gas to be introduced into the ionization chamber, the analysis controller controls, for example, the reagent-gas supplier to immediately discontinue the supply of the reagent gas into the ionization chamber when the analysis of the one sample under the ionization by the CI method in the mass spectrometer has been completed, i.e. when the ionization of the reagent gas in the ion source has been unnecessary. On the other hand, if the current analysis is the last one in the continuous analysis, or if the current analysis is a single analysis and not a continuous one, there is no subsequent analysis to be performed after the analysis of the one sample under the ionization by the CI method. In that case, the analysis controller also controls, for example, the reagent-gas supplier to immediately discontinue the supply of the reagent gas into the ionization chamber when the analysis of the one sample under the ionization by the CI method in the mass spectrometer has been completed.

Thus, after the ionization by the CI method has been unnecessary in the ion source, the generation of the reagent-gas ions within the ionization chamber is discontinued. Therefore, the adhesion of the reagent-gas ions to the inside of the ionization chamber or other locations will be even further reduced.

The previously described technique is not limited to the GC-MS but may be applied in a single-type mass spectrometer having an ion source capable of switching between the CI method and the EI method. Even in the latter case, a similar effect can be obtained by controlling the device in the previously described manner when automatically performing a series of continuous analyses or successively performing a plurality of individual analyses.

Advantageous Effects of the Invention

In the gas chromatograph mass spectrometer according to the present invention, reagent-gas ions are generated within the ionization chamber only within a specific period of time which includes the retention time of a compound for which a mass spectrometric analysis under the ionization by the CI method must be performed or for which a mass spectrometric analysis under that ionization should preferably be performed. The adhesion of the reagent-gas ions to the inner wall of the ionization chamber, repeller electrode or other locations is thereby reduced, so that a high level of detection sensitivity and high level of measurement reproducibility can be maintained for a long period of time. The amount of maintenance tasks, such as the cleaning of the ionization chamber, can also be reduced. This improves the availability of the device and decreases the analyzing cost.

DESCRIPTION OF EMBODIMENTS

Figure 1:
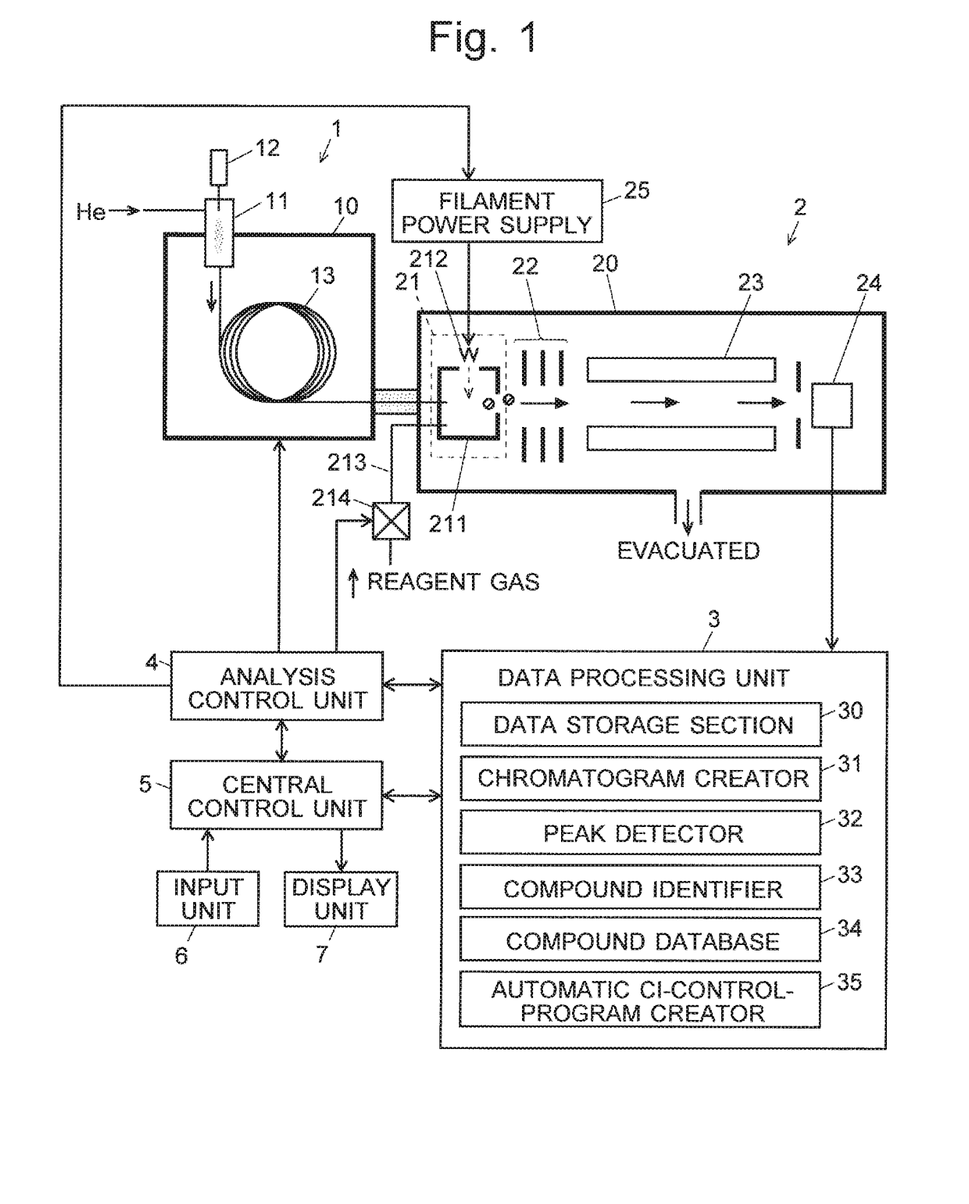
FIG. 1 is a configuration diagram of the main components of a GC-MS as one embodiment of the present invention.

A GC-MS as one embodiment of the present invention is hereinafter described with reference to the attached drawings. FIG. 1 is a configuration diagram of the main components of the GC-MS according to the present embodiment.

A gas chromatograph 1 has a sample vaporization chamber 11 at the inlet end of a capillary column 13 contained in a column oven 10. A carrier gas, such as helium, is supplied through the sample vaporization chamber 11 into the capillary column 13. The sample vaporization chamber 11 is heated. After the measurement is initiated, a trace amount of liquid sample is dropped from an injector 12 into the sample vaporization chamber 11. This liquid sample quickly turns into vapor and is carried by the stream of the carrier gas into the capillary column 13. While the sample is passing through the capillary column 13, the various compounds contained in the sample are temporally separated from each other and sequentially introduced into a mass spectrometer 2.

The mass spectrometer 2 includes a vacuum chamber 20 evacuated with a vacuum pump (not shown). This chamber contains an ion source 21, lens electrode 22, quadrupole mass filter 23 and ion detector 24. The ion source 21 is an EI/CI combination ion source, which includes: an ionization chamber 211 into which a sample gas containing a compound is to be introduced; a filament 212 for generating thermions; and a reagent-gas passage 213 in which a valve 214 is provided. When a predetermined amount of electric current is supplied from a filament power supply to the filament 212, the filament 212 becomes heated and generates thermions.

When an ionization by the EI method is performed, the electric current is supplied to the filament 212, with the valve 214 in the closed (off) state. The thermions are accelerated and injected the ionization chamber 211 by an electric field created by DC voltages applied to an electrode (not shown), ionization chamber 211, filament 212 and other related elements. Due to a collision with those thermions, the compound in the sample gas introduced into the ionization chamber 211 is ionized. On the other hand, when an ionization by the CI method is performed, the electric current is supplied to the filament 212, with the valve 214 in the open (on) state. Accordingly, the reagent gas is supplied through the reagent-gas passage 213 into the ionization chamber 211. The thermions come in contact with the reagent gas and generate reagent-gas ions. The reagent-gas ions chemically react with the compound in the sample gas, whereby ions originating from the compound are generated. In either of the EI and CI methods, the ions derived from the compound in the ionization chamber 211 are ejected from the ionization chamber 211 in the rightward direction in FIG. 1 due to the effect of the electric field created by a repeller electrode located within the ionization chamber 211.

The ions ejected from the ionization chamber 211 are converged by an electric field created by the lens electrode 22 and sent into the quadrupole mass filter 23. In the quadrupole mass filter 23, a predetermined voltage generated by superposing a DC voltage on a radio-frequency voltage is applied to each of the four rod electrodes forming the same filter. Only an ion having a mass-to-charge ratio m/z corresponding to that voltage is selectively allowed to pass through the filter 23 and reach the ion detector 24. The mass-to-charge ratio of the ion to be allowed to pass through the quadrupole mass filter 23 can be continuously changed over a predetermined range of mass-to-charge ratios by changing the voltage applied to the rod electrodes of the same filter 23 over a predetermined range. The ion detector 24 generates detection signals corresponding to the amount of incident ions. Those signals are converted into digital signals by an analogue-to-digital converter (not shown) and fed to a data processing unit 3.

The data processing unit 3 includes, as its functional blocks, a data storage section 30, chromatogram creator 31, peak detector 32, compound identifier 33, compound database 34, automatic CI-control-program creator 35 and other components. The compound database contains a collection of previously obtained reference mass spectra (fragment spectra obtained by the EI method) associated with a large number of compounds. An analysis control unit 4 controls each section of the device to perform a measurement as will be described later. A central control unit 5, to which an input unit 6 and display unit 7 are connected, gives instructions to the analysis control unit 4 and the data processing unit 3 to generally control each section of the device according to a predetermined control program, as well as displays analysis results and other items of information on the display unit 7. Normally, the central control unit 5 and the data processing unit 3 can be constructed using a general-purpose personal computer as a hardware resource, with their functions realized by executing, on this personal computer, a predetermined controlling and processing program installed on the same computer.

Figure 2:
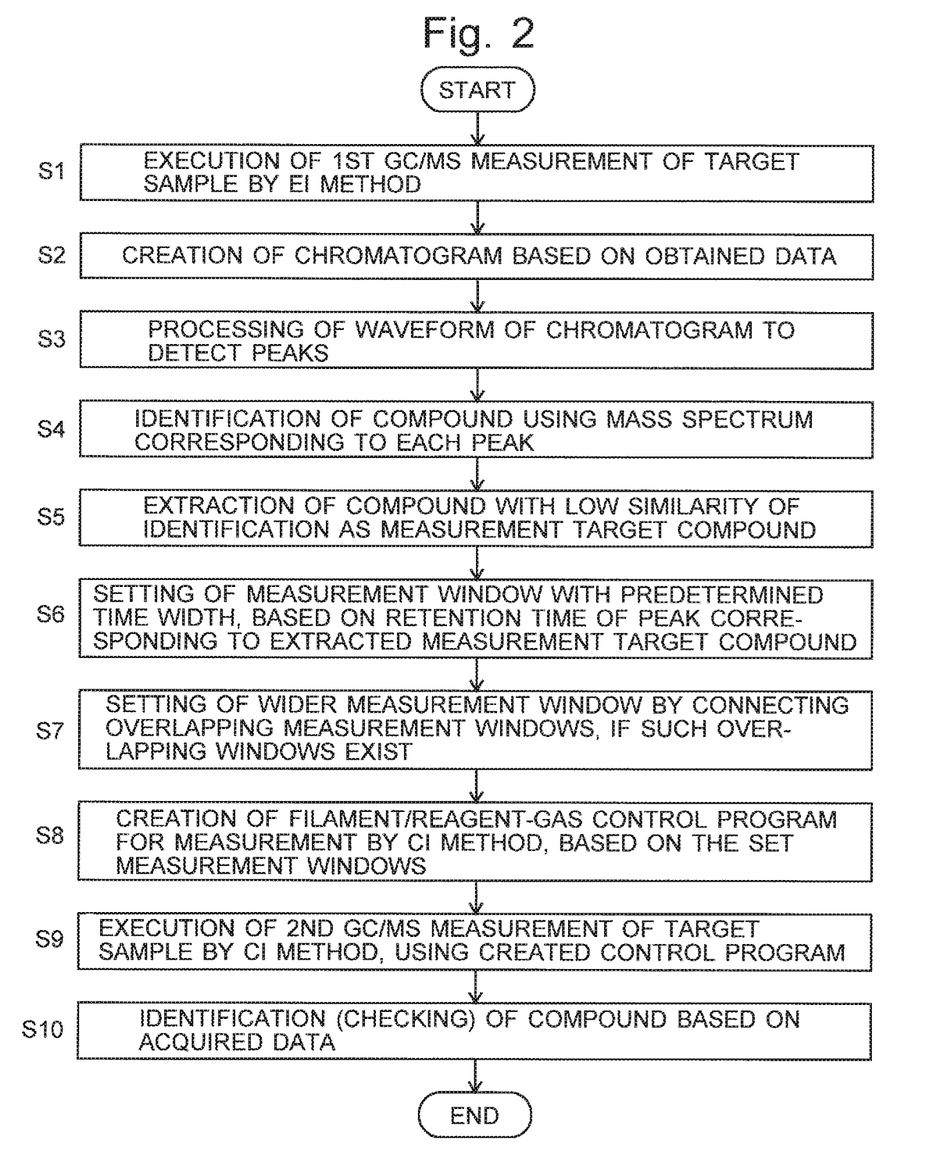
FIG. 2 is a flowchart of the control and processing in a characteristic measurement in the GC-MS according to the present embodiment.
Figure 3A:
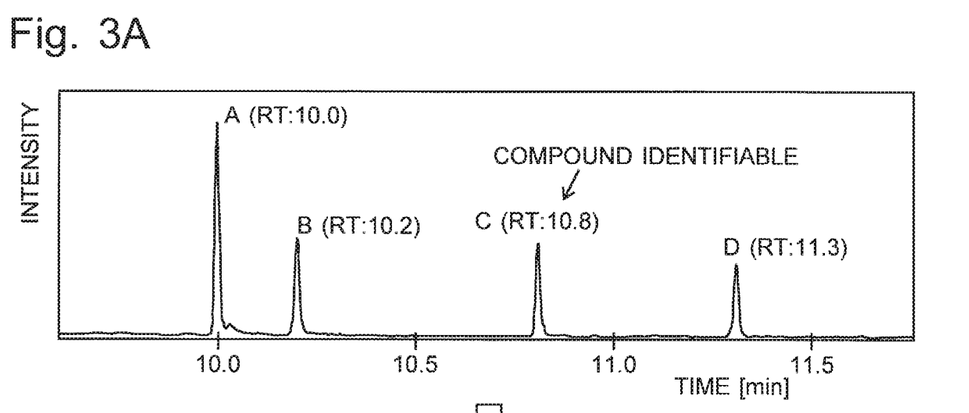
FIGS. 3A-3C are illustrations of an automatic CI-control-program creation process in the GC-MS according to the present embodiment.
Figure 3B:
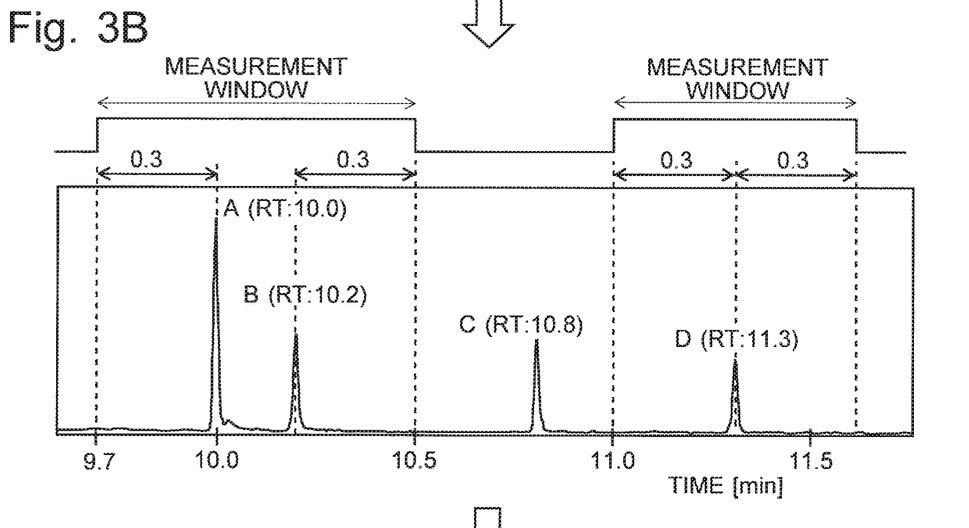
Figure 3C:
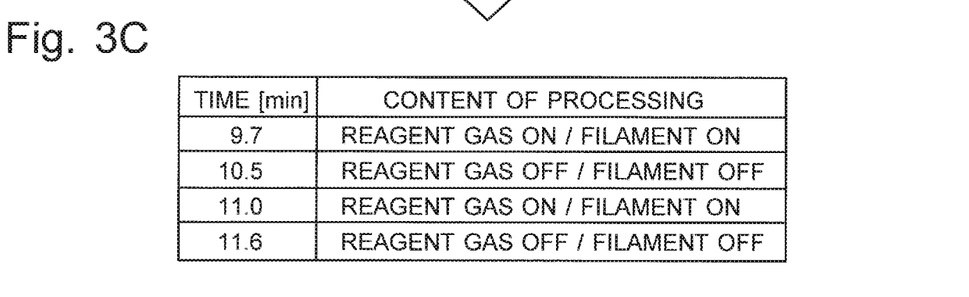

A characteristic measurement operation and processing in the GC-MS according to the present embodiment is hereinafter described with reference to FIG. 2 as well as FIGS. 3A-3C. FIG. 2 is a flowchart showing one example of the control and processing of a characteristic measurement in the GC-MS according to the present embodiment. FIGS. 3A-3C are illustrations of an automatic CI-control-program creation process. The following description deals with the case where the target sample contains a large number of compounds, and those compounds should be individually identified.

In the GC-MS according to the present embodiment, a GC/MS measurement for the target sample under the ionization by the EI method is initially performed as the first GC/MS measurement (Step S1). Specifically, the user performs a predetermined operation on the input unit 6. Then, under the command of the central control unit 5, the analysis control unit 4 controls the valve 214 and the filament power supply 25 so that the ionization by the EI method is performed in the ion source 21. The analysis control unit 4 also controls other sections of the gas chromatograph 1 and the mass spectrometer 2. As a result, the target sample is dropped from the injector 12 into the sample vaporization chamber 11 in the gas chromatograph 1. While the vaporized target sample is passing through the column 13, the various compounds in the sample are temporally separated from each other and sequentially introduced into the ion source 21.

In the ion source 21, with the value 214 closed, the compound originating from the sample introduced into the ionization chamber 221 comes in contact with the thermions generated by the filament 212 and is thereby ionized. The quadrupole mass filter 23 is operated to repeat a scan measurement over a predetermined range of mass-to-charge ratios. During the measurement, a set of data forming a mass spectrum covering the predetermined range of mass-to-charge ratios is repeatedly fed to the data processing unit 3 with the passage of time. Those data are stored in the data storage section 30.

After (or even before) the first GC/MS measurement is completed, the chromatogram creator 31 creates a chromatogram (total ion chromatogram) based on the collected data (Step S2). The peak detector 32 performs a predetermined waveform-processing operation on the created chromatogram to detect each peak and obtain peak information, such as the peak-top time, beginning point and ending point of the peak (Step S3).

Although some of the peaks originating from multiple compounds may possibly overlap each other, one peak observed on the chromatogram basically has one corresponding compound. Accordingly, for each peak detected in Step S3, the compound identifier 33 retrieves a measured mass spectrum acquired at the peak-top time, or retention time, of the peak from the data storage section 30, and compares it with mass spectra stored in the compound database 34 to identify the compound (Step S4). Specifically, the degree of similarity in spectrum pattern between the measured mass spectrum and each reference mass spectrum in the compound database 34 is calculated according to a predetermined algorithm. A compound associated with a reference mass spectrum having the highest degree of similarity is selected as an identification candidate. Accordingly, an identification candidate of the compound is found for each peak on the chromatogram along with its degree of similarity. Needless to say, some compounds have high degrees of similarity and can be considered as correct compounds with a high degree of certainty, while some other compounds have low degrees of similarity and are questionable as to whether they have been correctly identified. In any case, the identification results (i.e. the kinds of compounds and their degrees of similarity) for all peaks are displayed, for example, in the form of a list on the screen of the display unit 7.

The user checks the displayed identification results. If necessary, the user operating the input unit 6 issues a command to carry out the process of automatically creating a control program for performing the GC/MS measurement under the ionization by the CI method. Then, the automatic CI-control-program creator 35 performs the following processing.

Initially, a compound which satisfies a previously set condition is extracted as a measurement target compound from the identification results obtained in Step S4. The condition may be appropriately specified; in the present example, a compound for which the degree of similarity calculated in the compound identification process has been equal to or lower than a predetermine threshold, i.e. a compound which has not been identified with a sufficient degree of certainty based on the spectrum pattern of the mass spectrum acquired under the ionization by the EI method, is extracted as the measurement target compound (Step S5). The threshold for judging the degree of similarity may be a default value, or the user may be allowed to set an appropriate value.

Next, a measurement window with a time width of $2\Delta T$ is set around the actual retention time of the extracted measurement target compound, i.e. the peak-top time of the peak corresponding to the compound, where $\Delta T$ is the retention-time allowance width which is set before and after the retention time (Step S6). This retention-time allowance width ΔT may also be a default value, or the user may be allowed to set an appropriate value. In some cases, measurement windows which have been respectively set for two or more peaks may overlap each other, or there may be two neighboring peaks whose measurement windows do not overlap each other but whose difference in retention time is equal to or smaller than the predetermined allowance value (i.e. the retention-time-difference allowance value). In such cases, the measurement windows which have been set for those neighboring peaks should be connected to form a wider single measurement window (Step S7).

FIG. 3A shows one example of the chromatogram obtained by a GC/MS measurement performed in the previously described manner. In this example, four peaks A, B. C and D have been detected by the peak detection process, with their respective retention times (RT) located at 10.0, 10.2, 10.8 and 11.3 minutes. Now, consider a situation in which the compound identification has been performed for each of the four peaks, with the result that a compound with a high degree of certainty, or a high degree of similarity, has been identified for peak C while compounds with low degrees of similarity have been identified for three other peaks A, B and D (i.e. satisfactory identification candidates have not been found). In this case, each of the compounds respectively selected as the identification candidates for the three peaks A, B and D will be the measurement target compound mentioned earlier.

In Step S6, for example, a measurement window with ΔT=0.3 minutes is set at a retention time of 11.3 minutes for a measurement target compound corresponding to peak D. As a result, a measurement window which covers a time range from 11.0 to 11.6 minutes including the peak D is set, as shown in FIG. 3B. On the other hand, the measurement windows for the peaks A and B overlap each other since the difference in retention time between these peaks is 0.2 minutes. Therefore, a measurement window which covers a time range from 9.7 to 10.5 minutes including both peaks A and B is set by the processing of Step S7. Even if the difference in retention time between the two peaks A and B were equal to or greater than 0.3 minutes, e.g. 0.4 minutes, a measurement window which covers a wide range of time including both peaks A and B would be set if the retention-time-difference allowance value were 0.5 minutes, for example.

After the measurement windows have been set for all measurement target compounds, a control program for the GC/MS measurement under the ionization by the CI method is created (Step S8). Specifically, the control program is created so that the supply of the reagent gas is initiated and the filament 212 is energized at the beginning point of each measurement window, while the supply of the reagent gas is discontinued and the filament 212 is deenergized at the ending point of each measurement window. In the example of FIG. 3B, the measurement windows are set at the periods of time of 9.7 to 10.5 minutes and 11.0 to 11.6 minutes. Therefore, as shown in FIG. 3C, the control program is created so that the supply of the reagent gas is initiated and the filament 212 is energized at each of the time points of 9.7 and 11.0 minutes, while the supply of the reagent gas is discontinued and the filament 212 is deenergized at each of the time points of 10.5 and 11.6 minutes. The created control program is sent to the central control unit 5 or analysis control unit 4.

Automatically, or upon receiving a command from the user, the analysis control unit 4 conducts a GC/MS measurement for the target sample under the ionization by the CI method as the second GC/MS measurement, controlling the valve 214 and the filament power supply according to the control program (Step S9). For example, in the case of a control according to the control program shown in FIG. 3C, the valve 214 is opened and the electric current is supplied from the filament power supply 25 to the filament 212 to energize the filament 212 for the ionization by the CI method in the ion source 21 during the time range from 9.7 to 10.5 minutes as well as the time range from 11.0 to 11.6 minutes. During each of these time ranges, a sample gas containing a compound extracted as a measurement target compound in Step S5 is introduced into the ion source 21. This compound is ionized, and the resulting ions are subjected to mass spectrometry. During the other time ranges, no reagent-gas ion is generated within the ionization chamber 211, since the valve 214 is closed and the filament 212 is deenergized.

In the ion source 21 of the mass spectrometer 2, the ionization is carried out only within a limited time range in the previously described manner, and a mass spectrometric analysis for the thereby generated ions is performed. The thereby obtained mass spectrum data are stored in the data storage section 30. The chromatogram creator 31 creates a chromatogram based on the obtained data. The peak detector 32 detects a peak corresponding to the target compound on the chromatogram. The compound identifier 33 identifies the compound corresponding to the detected peak (Step S10).

Specifically, the compound identifier 33 locates a molecule-related ion peak of a target compound from a mass spectrum obtained at the peak-top position of the detected peak and estimates the molecular weight of the target compound from the mass-to-charge ratio of the peak. Typically, the molecule-related ion peak is a protonated ion peak formed by the addition of a proton to the target compound (or a deprotonated ion peak formed by the removal of a proton from the target compound). Then, the compound identifier 33 checks the molecular weight against the compound database 34 to determine whether or not the identification candidate estimated for the target compound in Step S4 is appropriate. If a compound which is more likely to be the correct compound than the identification candidate being examined has been located in the database, that compound may be extracted as a new identification candidate.

Thus, only a peak which has not been identified with a sufficient degree of certainty from the result of the GC/MS measurement performed under the ionization by the EI method (unknown compound) is identified based on the result of the subsequent GC/MS measurement performed under the ionization by the CI method. In the GC/MS measurement under the ionization by the CI method, the ionization by the CI method is suspended while a compound which has already been identified with a sufficient degree of certainty from the result of the GC/MS measurement performed under the ionization by the EI method is being introduced into the ion source 21. Therefore, the period of time in which the ionization chamber 211 is filled with the reagent-gas ions will be considerably limited, so that the adhesion of the reagent-gas ions to the inner wall of the ionization chamber 211, repeller electrode or other locations will be reduced.

As noted earlier, the conditions of the extraction of a measurement target compound from the identification results obtained in Step S4 can be appropriately specified. In the previous example, a compound which has been identified with a low degree of certainty, or a low degree of reliability, is extracted. However, the degree of certainty of the identification may be disregarded. For example, it is possible to extract a compound whose peak-area value or peak-top-height value on the chromatogram exceeds a predetermined threshold, i.e. a compound contained in a large quantity, or conversely, to extract a compound contained in a small quantity.

It is also possible to allow the user to manually select a measurement target compound, instead of automatically extracting a measurement target compound. For example, the device may be configured to allow the user operating the input unit 6 to indicate a peak or identification result on the list of the identification results (the kinds of compounds and their degrees of similarity) displayed on the screen of the display unit 7 after the processing in Step S4, and select a compound corresponding to the indicated peak or identification result as the measurement target compound. It is also possible to additionally display a chromatogram and allow the user to indicate a peak on the chromatogram by the clicking or similar operations and command the device to select the identification result corresponding to the indicated peak as the measurement target compound.

In the previous embodiment, the supply of the reagent gas to the ionization chamber 211 is discontinued and the filament 212 is deenergized when the GC/MS measurement under the ionization by the CI method should be suspended. Actually, performing only one of these two controls is sufficient. For example, if the filament 212 is deenergized while the supply of the reagent gas is continued, the reagent gas fills the ionization chamber 211 but does not undergo ionization, so that the ionization by the CI method does not occur. If the supply of the reagent gas is discontinued while the filament 212 is maintained in the energized state, the ionization by the CI method also does not occur since no reagent-gas ion is generated within the ionization chamber 211.

Figure 4:
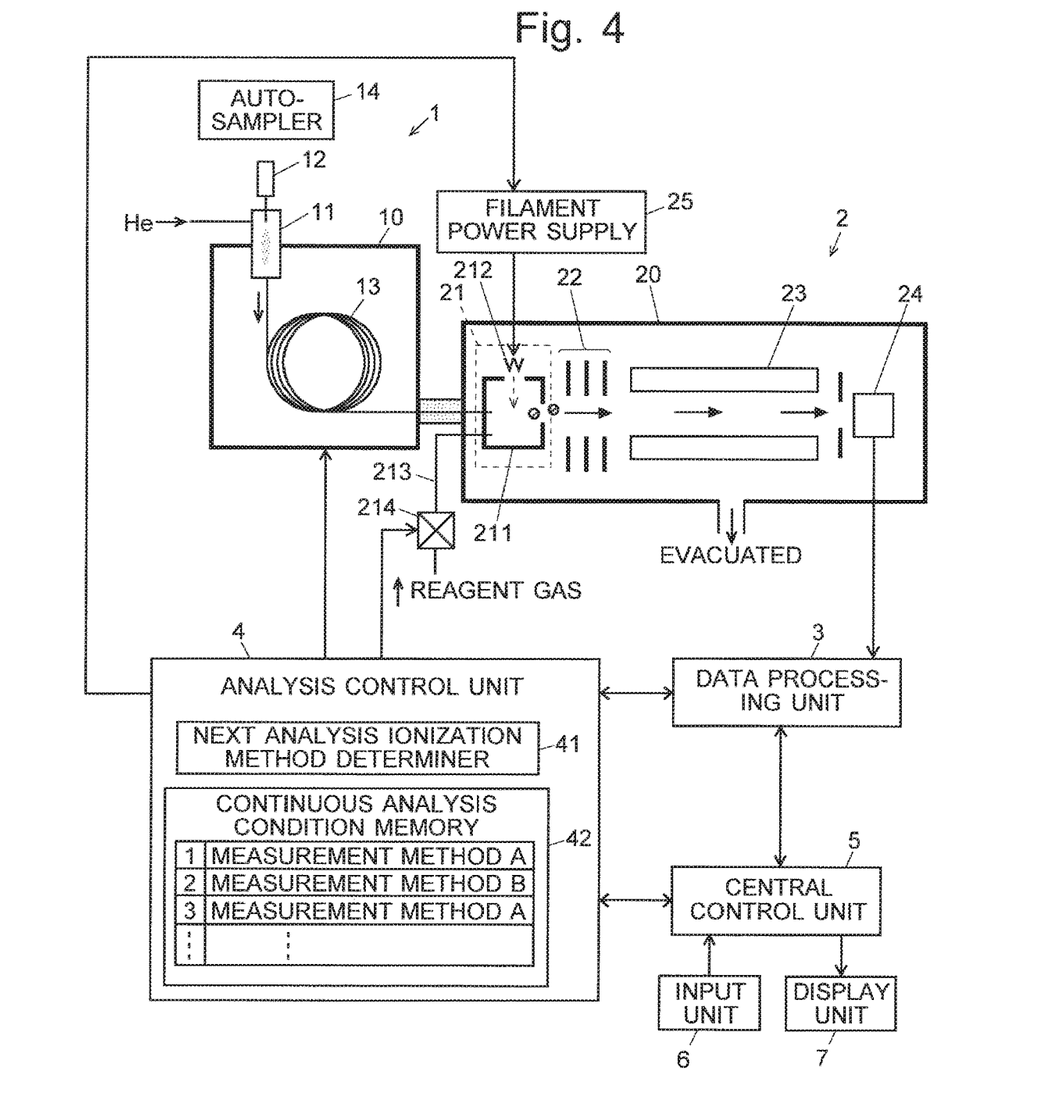
FIG. 4 is a configuration diagram of the main components of a GC-MS as a second embodiment of the present invention.
Figure 5:
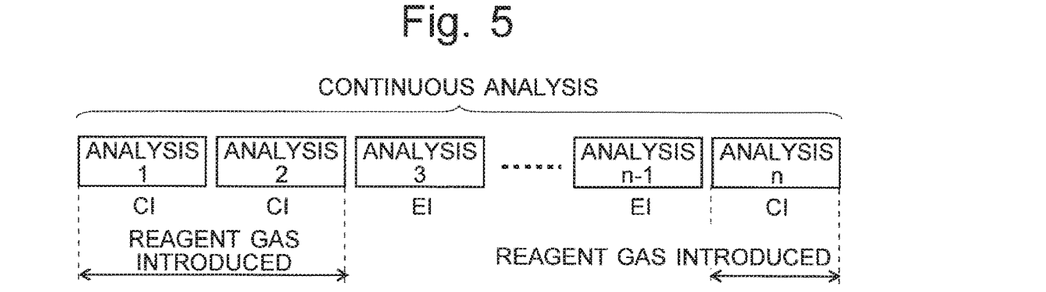
FIG. 5 is an illustration of the control operation in a characteristic measurement in the GC-MS according to the second embodiment.

Next, a GC-MS as another embodiment of the present invention is described with reference to FIGS. 4 and 5. FIG. 4 is a configuration diagram of the main components of the GC-MS according to the present embodiment. FIG. 5 is an illustration of the control operation in a characteristic measurement in the present GC-MS. In FIG. 4, the components which are identical or correspond to those of the GC-MS shown in FIG. 1 are denoted by the same numerals, and descriptions of those components will be omitted unless the need arises.

In the GC-MS according to the present embodiment, the gas chromatograph 1 includes an autosampler 14 which appropriately selects one of the prepared samples and makes the selected sample be suctioned into the injector 12 as the sample to be subjected to the measurement. With this mechanism, the GC-MS according to the present invention can automatically carry out a continuous analysis for a plurality of samples. The analysis control unit 4 includes a next analysis ionization method checker 41 and a continuous analysis condition memory 42 as its functional blocks.

When a continuous analysis is to be performed, the user previously sets measurement conditions for each individual analysis in the continuous analysis from the input unit 6. The measurement conditions include information concerning the selection of the ionization method. i.e. which of the EI, CI and NCI methods should be used. The technique which includes an analysis of a sample under the EI method followed by an analysis of the same sample under the CI method, as described in the previous embodiment, may also be set as a measurement condition for one analysis. The measurement conditions which have been set in this manner are each saved as a file named a "measurement method" to the continuous analysis condition memory 42. It is naturally possible to apply the same measurement method to a plurality of analyses.

When the continuous analysis is initiated, the analysis control unit 4 reads measurement conditions stored in the measurement method in a predetermined order and carries out a GC/MS measurement by controlling each section of the device according to the measurement conditions. For example, when the CI method is selected as the ionization method, the analysis control unit 4 opens the valve to supply the reagent gas into the ionization chamber 211 simultaneously with the initiation of the analysis in the mass spectrometer 2, as well as operates the filament power supply 25 to supply an electric current to the filament 212 and energize the same filament 212.

Concurrently with these operations, the next analysis ionization method checker 41 reads the measurement conditions stored in the measurement method corresponding to the next analysis to be performed after the currently performed analysis, and determines whether the ionization method is the CI method or EI method. If the ionization method used in the currently performed analysis is the CI method and the one to be used in the next analysis is the EI method, the valve 214 should be closed to discontinue the supply of the reagent gas into the ionization chamber 211, and the filament 212 should be deenergized, as soon as the analysis currently performed in the mass spectrometer 2 is completed. e.g. as soon as a predetermined analysis execution period has passed.

If the ionization method used in the currently performed analysis is the EI method and the one to be used in the next analysis is the CI method, the valve 214 should be opened to initiate the supply of the reagent gas into the ionization chamber 211, and the filament 212 should be energized, when the next analysis is initiated in the mass spectrometer 2. If the ionization method used in the currently performed analysis is the CI method and this analysis is the last one in the continuous analysis, i.e. if there is no more analysis scheduled, the valve 214 should be closed to discontinue the supply of the reagent gas into the ionization chamber 211, and the filament 212 should be deenergized, as soon as the analysis currently performed in the mass spectrometer 2 is completed.

Consider a continuous analysis in which n analyses, from "Analysis 1" to "Analysis n", are scheduled to be sequentially performed, as shown FIG. 5, where the ionization by the CI method is set in the first and second analyses, while the ionization by the EI method is set in the third analysis. In this case, the reagent gas is supplied into the ionization chamber 211 from the point in time where the first analysis is initiated in the mass spectrometer 2, to the point in time where the second analysis is completed. The supply of the reagent gas is discontinued as soon as the second analysis is completed. The supply of the reagent gas is also discontinued as soon as the last analysis in the continuous analysis is completed.

By such a control, the total length of time during which the reagent-gas ions are generated within the ionization chamber 211 can be more certainly reduced, so that the adhesion of the reagent-gas ions to the inner wall of the ionization chamber 211, repeller electrode and other locations can be reduced.

A similar control to the previously described one can be performed not only in a series of continuous analyses but also in the case where a plurality of individual analyses set by the user are successively performed according to a specified schedule.

It should be noted that any of the previous embodiments is a mere example of the present invention, and any modification, change or addition appropriately made within the spirit of the present invention other than the previously described variations will naturally fall within the scope of claims of the present application.

REFERENCE SIGNS LIST

1 . . . Gas Chromatograph
10 . . . Column Oven
11 . . . Sample Vaporization Chamber
12 . . . Injector
13 . . . Capillary Column
14 . . . Autosampler
2 . . . Mass Spectrometer
20 . . . Vacuum Chamber
21 . . . Ion Source
211 . . . Ionization Chamber
212 . . . Filament
213 . . . Reagent-Gas Passage
214 . . . Valve
22 . . . Lens Electrode
23 . . . Quadrupole Mass Filter
24 . . . Ion Detector
25 . . . Filament Power Supply
3 . . . Data Processing Unit
30 . . . Data Storage Section
31 . . . Chromatogram Creator
32 . . . Peak Detector
33 . . . Compound Identifier
34 . . . Compound Database
35 . . . Automatic CI-Control-Program Creator
4 . . . Analysis Control Unit
41 . . . Next Analysis Ionization Method Checker
42 . . . Continuous Analysis Condition Memory
5 . . . Central Control Unit
6 . . . Input Unit
7 . . . Display Unit

The invention claimed is:

1. A gas chromatograph mass spectrometer employing a mass spectrometer as a detector for a gas chromatograph, the mass spectrometer provided with an ion source including: an ionization chamber to which a sample gas is supplied; a thermion generator for generating thermions; and a reagent-gas supplier for supplying a reagent gas into the ionization chamber, the ion source capable of switching between an ionization by an electron ionization method in which a component in a sample gas supplied into the ionization chamber is ionized by making a thermion generated by the thermion generator come in contact with the component, and an ionization by a chemical ionization method in which a component in a sample gas is ionized by an action of a reagent-gas ion generated by making a thermion generated by the thermion generator come in contact with a reagent gas supplied into the ionization chamber by the reagent-gas supplier, the gas chromatograph mass spectrometer further comprising:

a) a control information creator for determining a time range during which a gas chromatograph mass spectrometric analysis under the ionization by the chemical ionization method is to be performed, based on a chromatogram obtained by performing a gas chromatograph mass spectrometric analysis on a target sample over a predetermined period of time while performing the ionization by the electron ionization method in the ion source, and for creating control information including a piece of information indicating the time range; and b) an analysis controller for performing a gas chromatograph mass spectrometric analysis on the target sample while performing the ionization by the chemical ionization method in the ion source, by controlling the reagent-gas supplier and the thermion generator based on the control information so as to supply the reagent gas into the ionization chamber by the reagent-gas supplier while generating thermions by the thermion generator during the aforementioned time range, and so as to discontinue a supply of the reagent gas by the reagent-gas supplier and/or discontinue a generation of thermions by the thermion generator within a period of time other than the aforementioned time range.

2. The gas chromatograph mass spectrometer according to claim 1, wherein:

the gas chromatograph mass spectrometer further comprises a compound identifier for identifying a compound corresponding to a peak detected on the chromatogram, based on position information of the peak or mass spectrum information obtained by a mass spectrometric analysis at a position of the peak; and the control information creator extracts a compound for which a gas chromatograph mass spectrometric analysis under the ionization by the chemical ionization method needs to be performed, based on an identification result obtained by the compound identifier, and determines the time range from a position of a peak corresponding to the extracted compound.

3. The gas chromatograph mass spectrometer according to claim 2, wherein the control information creator extracts a compound for which the gas chromatograph mass spectrometric measurement under the ionization by the chemical ionization method needs to be performed, by judging an index value indicating a degree of certainty of an identification, where the index value is calculated when the identification is performed by the compound identifier.

4. The gas chromatograph mass spectrometer according to claim 2, wherein:

the gas chromatograph mass spectrometer further comprises a result presenter for presenting an identification result obtained by the compound identifier to a user; and the control information creator extracts a compound for which the gas chromatograph mass spectrometric measurement under the ionization by the chemical ionization method needs to be performed, based on an instruction given by the user in response to a presentation of a result by the result presenter.

5. The gas chromatograph mass spectrometer according to claim 2, wherein the control information creator determines the time range by setting a predetermined time width as allowance time before and after a retention time of the peak corresponding to the extracted compound, or before and after the beginning point and ending point of the peak.

6. The gas chromatograph mass spectrometer according to claim 5, wherein the control information creator determines the time range for a plurality of temporally neighboring peaks corresponding to a plurality of extracted compounds, in such a manner as to include an interval between the peaks within the time range if a difference in retention time between the peaks is smaller than the predetermined time width.

7. The gas chromatograph mass spectrometer according to claim 1, wherein, before or during an execution of an analysis of one sample under the ionization by the chemical ionization method, the analysis controller recognizes the ionization method to be used in another analysis to be performed subsequently to the analysis of the one sample, if such a subsequent analysis is present, and controls the reagent-gas supplier to discontinue the supply of the reagent gas into the ionization chamber and/or controls the thermion generator to discontinue the generation of thermions no later than the completion of the analysis of the one sample under the ionization by the chemical ionization method in the mass spectrometer, if the ionization method to be used in the subsequent analysis is the electron ionization method, or if there is no subsequent analysis to be performed after the analysis of the one sample.

8. The gas chromatograph mass spectrometer according to claim 3, wherein the control information creator determines the time range by setting a predetermined time width as allowance time before and after a retention time of the peak corresponding to the extracted compound, or before and after the beginning point and ending point of the peak.

9. The gas chromatograph mass spectrometer according to claim 4, wherein the control information creator determines the time range by setting a predetermined time width as allowance time before and after a retention time of the peak corresponding to the extracted compound, or before and after the beginning point and ending point of the peak.

* * * * *